May 9, 1967     L. J. LAPOINTE ET AL     3,318,431

SPRING AND SCREW COMBINATION CARRIAGE DRIVE MEANS

Filed Jan. 14, 1966

INVENTORS
LLOYD J. LAPOINTE
RALPH L. PARKER

BY Thomas S. Ross
Edward H. Loveman

ATTORNEYS

United States Patent Office
3,318,431
Patented May 9, 1967

3,318,431
SPRING AND SCREW COMBINATION CARRIAGE DRIVE MEANS
Lloyd J. Lapointe, West Hartford, and Ralph L. Parker, Rockville, Conn., assignors to Royal Typewriter Company, Inc., Hartford, Conn., a corporation of Delaware
Filed Jan. 14, 1966, Ser. No. 520,712
4 Claims. (Cl. 197—90)

This invention relates to motion conversion apparatus; more particularly it relates to a nut and a lead screw mechanism for converting rotary motion of the screw into linear motion of the nut; and specifically it relates to apparatus of the aforesaid type wherein the nut is characterized by a resilient compliant member which is frictionally coupled to the thread of a conventional lead screw.

In certain applications of nut and lead screw mechanisms, for example in a matrix typewriting machine, the nut may be secured to or form a part of a carriage, which is adapted to be moved in carriage return and tabulating (letter feed) directions relative to the side plates of the machine frame, upon rotation of a lead screw rotatably mounted between the side plates. Generally, carriages in these machines support a positionable printing head, and the carriage in turn is supported by a guide rail which is parallel to the lead screw. In mechanisms of this nature, if either or both the guide rail and lead screw are not perfectly parallel there is a tendency of jamming. Thus, to compensate for deviations from parallelism of the lead screw and guide rail, the nut has to be manufactured for loose coupling with consequent backlash or play between the carriage and the lead screw. Moreover there is usually no provision for compensating for wear of the parts after a period of use, such wear resulting in additional undesirable play and accordingly inaccurate motion conversion.

In accordance with the present invention, the carriage comprises a frame to which is secured a nut which takes the form of a spring coil with its axis coextensive with that of its associated lead screw. The spring coil is formed from a stiff material and stressed as it is assembled to the lead screw whereby its coils are engaged with the sides of the lead screw thread. Rotation of the lead screw, translates the spring thereby moving the carriage in an axial direction perpendicular to the axis of rotation of the lead screw. Backlash and end play are eliminated by the stressed spring gripping the sides of the lead screw thread and deviations in the parallelism between the lead screw and the guide are compensated by the end portion of the spring coil fastened to the frame.

Accordingly, an object of the invention is to provide a nut and lead screw construction which eliminates backlash and end play.

Another object of the invention is in the provision of a nut and lead screw construction which accommodates deviations in the parallelism between the lead screw and a guide rail supporting the carriage.

Still another object of the invention is in the provision of the nut construction which automatically adjusts for wear of either the lead screw or the nut.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
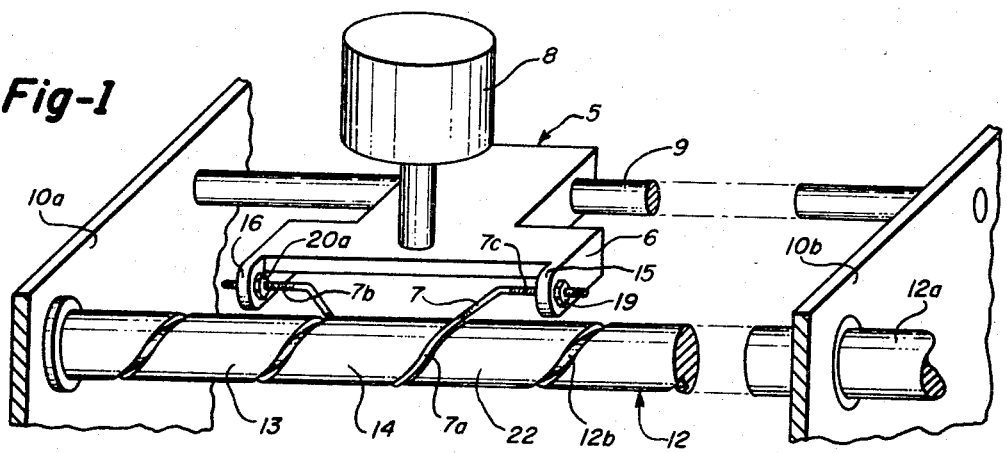
FIGURE 1 is a partial perspective view of the printing head carriage of a matrix typewriter showing carriage drive and support elements in accordance with a preferred embodiment of the invention.
Figure 2:
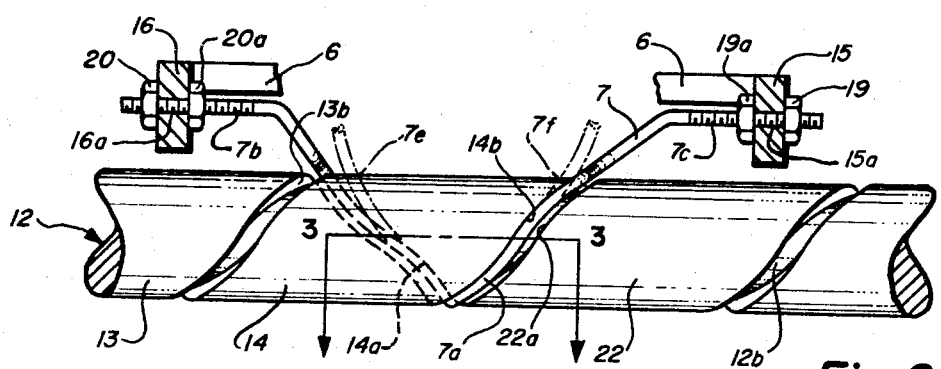
FIGURE 2 is an enlarged front view of the lead screw, spring coil, and spring attachment to the carriage of FIGURE 1.

Referring now to the drawings wherein like reference numerals designate like or corresponding elements throughout the several views and wherein a preferred embodiment is illustrated, there is shown in FIGURE 1 a matrix typewriter carriage generally designated by reference numeral 5. The carriage comprises a frame 6, and carries a single positionable print element 8 disposed thereon. In addition to carrying all the elements required to position print element 8, frame 6 has right and left protruding lugs 15 and 16 formed with holes 15a and 16a respectively, for securing a spring 7 to the carriage. Carriage 5 is supported for motion, in return and tabulating directions, by a relatively friction free mounting to a stationary guide rail 9 fixed in left and right machine side plates 10a and 10b respectively. A lead screw, which is generally designated by reference numeral 12, is journalled in side plates 10a and 10b for rotation, and is in juxtaposition to carriage 5 and parallel to guide 9. Lead screw 12 is comprised of a cylinder 12a with a helical groove 12b cut around the cylinder as shown in FIGURE 2. A projecting part 14 of groove 12b is known as the screw thread. The pitch of lead screw 12 is the axial distance from one side of thread 14 to the same side of a second thread 13. Upon a single revolution of screw 12 a mating nut, which is prevented from rotating, will advance an axial distance equivalent to the pitch. The mating nut or spring 7 is comprised of a single coil 7a and straight end sections 7b and 7c. End sections 7b and 7c, which are threaded with a conventional screw thread, as disposed in opposite directions to one another and substantially parallel to the axis of revolution of spring coil 7a. Spring coil 7a is installed on lead screw 12 and spring end sections 7b and 7c fastened to lugs 15 and 16 respectively, with hold down nuts 19 and 20 and lock nuts 19a and 20a (FIGURE 2). Conventional motive power rotates lead screw 12, under control of a typewriter escapement, and this motion is converted into axial motion of carriage 5 as will hereinafter be more fully described.

Spring 7 is formed from a stiff material e.g., music wire, preferably having a round cross sectional area and a diameter equivalent to the width of grooves 12b. However, due to machining tolerances, the diameter of the spring wire may be slightly larger or smaller than the groove dimension. If it is larger, spring coil 7a will not bottom in groove 12b, which is not in and of itself detrimental to motion conversion, but if it is smaller, there will be clearance between one lead screw working face and the spring coil which will result in backlash whenever the rotation of the lead screw is reversed. In order to prevent this condition from arising, spring coil 7a is formed with a pitch (distance between crests 7e and 7f, FIGURE 2) somewhat less than the pitch of lead screw 12 (distance between one side thread 14 and the same side of thread 13). For example, spring coil 7a of FIGURE 1 has a pitch of 0.990″, whereas lead screw 12 has a pitch of 1.000″.

Figure 3:
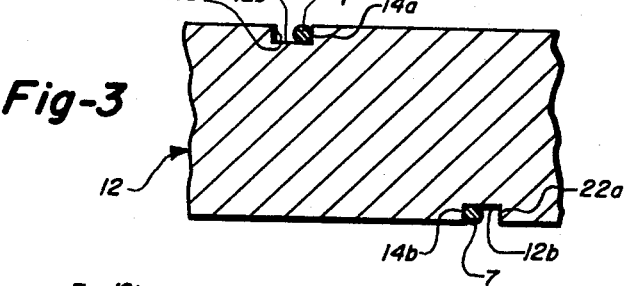
FIGURE 3 is a partial cross sectional view taken along the line 3—3 of FIGURE 2.

Due to this pitch difference, spring coil 7a must be stretched in order to engage the lead screw thread working faces 14a and 14b (FIGURES 2 and 3). This stretching produces a gripping force by spring coil 7a, which embraces the working faces of only one thread, viz. thread 14 as shown in FIGURES 2 and 3. Since thread 14 is gripped on both working faces 14a and 14b, there can be no backlash or end play when the lead screw direction of rotation is reversed. Furthermore, since the gripping force is equal and acts in opposite directions, the net force on the lead screw is zero, and thus the gripping force will not effect the translation of spring coil 7a and carriage 5 on lead screw 12.

Figure 4:
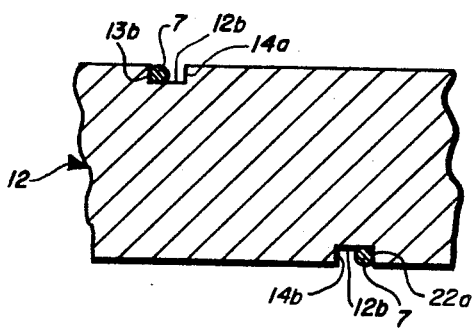
FIGURE 4 is a partial cross sectional view similar to FIGURE 3 showing the spring position when the spring coil pitch is greater than the lead screw pitch.

A similar gripping force, for eliminating backlash, may also be obtained by forming the pitch of spring coil 7a somewhat larger than the pitch of the lead screw. In this case, the spring coil is compressed in order to fit in the groove between threads 13 and 14 and between threads 14 and 22 (FIGURE 4). The resulting gripping force acts in opposite directions on two different threads i.e. thread working faces 13b and 22a as shown in FIGURE 4. Nevertheless, the effect is the same as that obtained with the stretched spring insofar as elimination of backlash and translation of the spring is concerned.

Although spring 7 has been shown with one full coil, a spring may be used with less than one full coil, but in this latter event the load carrying capacity of the spring would be diminished. On the other hand, adding coils will not increase or decrease the spring load carrying capacity from the value obtained with one coil.

As shown in FIGURE 1 and FIGURE 2, the lead screw thread is a standard Acme thread and the spring coil wire shape is round. Although the lead screw thread shape could have been half round, or square, or any other convenient shape, it is preferable that the spring coil wire shape always be round, and have a similar size as the groove between adjacent lead screw threads. However, other shapes and sizes will operate satisfactorily provided a pitch difference exists between the lead screw thread and the spring coil. This is especially true in the case where the spring coil wire diameter is smaller than the size of the groove between adjacent lead screw threads.

Since carriage 5 is supported on a relatively friction free mounting and the gripping force of spring coil 7a does not effect translation of carriage 5 (as previously discussed), the only force which spring 7 must overcome to move carriage 5 axially when lead screw 12 is rotated is the friction force between spring coil 7a and lead screw 12. By careful choice of materials and finishing of the mating surfaces, this force may be kept as low as 5% of the load capacity of the spring.

Consequently, rotation of lead screw 12 in either direction results in spring coil 7a sliding in an axial direction thereby moving carriage 5 in an axial direction. Since spring coil 7a engages opposite sides of the lead screw thread, backlash and end play are eliminated. In addition, any wear of either spring 7 or lead screw 12 will be compensated by the gripping force of the spring thereby preventing any end play. Any non-parallelism between guide 9 and lead screw 12 will be absorbed by the straight end portions 7b and 7c of the spring which are relatively flexible as compared to the rigid mounting of guide 9 and lead screw 12. Therefore, the mounting tolerances of the guide and lead screw are no longer critical, and any minor deviations in parallelism between them will not introduce end play or backlash.

Although the instant invention shown in FIGURE 1 has both ends of spring 7 secured to frame 6, it is only necessary to secure one end of the spring if it is comprised of at least one full coil. In this event, the free end of the coil is merely left in groove 12b between the threads of lead screw 12. Obviously, if the spring has less than a full coil, both ends must be secured to the frame, otherwise the spring will slide vertically off the lead screw.

It should be understood that the foregoing disclosure relates to only a preferred embodiment of the invention and that it is intended to cover all changes and modifications of the example of the invention herein chosen for the purpose of the disclosure which do not constitute departures from the spirit and scope of the invention.

The invention claimed is:

1. A motion converting device comprising in combination,
   a frame,
   a threaded lead screw journalled for rotation on said frame,
   a carriage adapted to be moved axially by said lead screw,
   and a spring having each end fastened to said carriage and having at least one coil which is threaded on said lead screw whereby rotation of said lead screw causes movement of said carriage in an axial direction, 2. Apparatus for longitudinally moving a matrix typewriter carriage in return and letter feed directions comprising,
   a frame,
   a threaded lead screw journalled for rotation on said frame,
   a guide rail fixed to said frame and positioned essentially parallel to said lead screw,
   a carriage slideably mounted on said guide rail and having a single element positionable printing head disposed thereon,
   and a spring fastened to said carriage and having at least one coil threaded on said lead screw whereby rotation of said lead screw moves said carriage in an axial direction.

3. Apparatus in accordance with claim 2 wherein only one end of said spring is fastened to said carriage.

4. Mechanism for converting rotary motion of a lead screw into linear motion of a carriage comprising in combination,
   a frame,
   a lead screw rotatably supported in said frame,
   a carriage support rail supported by said frame with its axis parallel to the axis of said lead screw,
   a carriage slidably mounted on and for movement axially of said rail,
   a spring having a coil turn threaded on said lead screw, the pitch of said coil turn differing from the pitch of the threads of said lead screw, terminal portions of said spring being bent off and extending in a direction parallel to the axis of said lead screw,
   and means for securing the ends of said terminal portions of said spring to said carriage.

References Cited by the Examiner

UNITED STATES PATENTS

| | | | |
|---|---|---|---|
| 1,023,490 | 4/1912 | Beck et al. | 74—59 |
| 1,921,235 | 8/1933 | Lindsey | 74—57 |
| 2,704,591 | 3/1955 | Bogert | 197—90 X |
| 3,122,026 | 2/1964 | Pearson et al. | 74—59 |

ROBERT E. PULFREY, *Primary Examiner.*

E. S. BURR, *Assistant Examiner.*